United States Patent Office 2,808,402
Patented Oct. 1, 1957

2,808,402

METHOD FOR PREPARING N-SORBITYL-CARBAMATES

Fred E. Boettner, Philadelphia, Pa., assignor to Rohm & Haas Company, Philadelphia, Pa., a corporation of Delaware No Drawing. Application August 19, 1954,
Serial No. 451,044

9 Claims. (Cl. 260—211)

This invention relates to a method for preparing alkyl N-alkyl-N-sorbitylcarbamates.

The present invention is concerned with the reaction between a cyclic urethane of an N-alkyl-N-sorbitylcarbamic acid and an alkanol to form an alkyl N-alkyl-N-sorbitylcarbamate having the formula

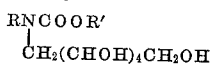

$$\text{CH}_2(\text{CHOH})_4\text{CH}_2\text{OH}$$

in which R is an alkyl group of one to eighteen carbon atoms and R' is an alkyl group of one to eighteen carbon atoms. Although satisfactory compounds are produced within the range of the definition just presented, the particularly preferred compounds are defined in that the number of the carbon atoms in the groups R and R' totals no more than twenty-four. That is, when R is eighteen, R' should preferably be no more than six and when R' is eighteen, R should preferably be no more than six.

Typical of the groups that R and R' may represent are methyl, ethyl, propyl, isopropyl, butyl, tert-butyl, pentyl, isopentyl, hexyl, octyl, isooctyl, tert-octyl, decyl, tert-decyl, dodecyl, tert-dodecyl, tetradecyl, hexadecyl, octadecyl, tert-octadecyl, and the like.

The cyclic urethanes of N-alkyl-N-sorbitylcarbamic acid are prepared in a manner disclosed in my copending application Serial No. 451,045, filed August 19, 1954, where it is shown that these cyclic urethanes are made by heating, in the range of 140° to 175° C., a mixture of an N-alkylglucamine and urea until two equivalents of ammonia are liberated. There is shown in the following preparation the method for making a typical cyclic urethane, in which parts by weight are used throughout.

PREPARATION

There were added to a reaction vessel 90 parts of N-methylglucamine and 30 parts of urea. The reaction mixture was heated to 140°–150° C. for four and a half hours during which time two equivalents of ammonia were liberated and absorbed in water. The system was then cooled to room temperature causing the solidification of the crystalline product. The product was recrystallized from 2B benzene denatured alcohol and gave a melting point of 145°–148° C. The product was identified as the cyclic urethane of N-methyl-N-sorbitylcarbamic acid, giving an analysis of 43.3% carbon (43.4% theoretical), 7.0% hydrogen (6.78% theoretical), and 6.7% nitrogen (6.33% theoretical).

The subject reaction is satisfactorily conducted in the temperature range of about 40° C. to the reflux temperature of the reaction mixture. The reaction occurs at temperatures below 40° C. but at such a sluggish rate as to approach impracticality. Usually normal room temperatures are too mild to induce an appreciable rate of reaction. A thermal impetus is required in order to obtain the desired results. Employing the temperature range set forth, yields in excess of 65% are consistently obtained.

A volatile, inert organic solvent may be employed, if desired, but such is not necessary. The use of a solvent aids in effecting a more intimate chemical contact between the reactants as well as helps in achieving maximum heat transfer benefits. Particularly suitable for this use is dimethylformamide, although other solvents may be advantageously employed, such as benzene, toluene, xylene, and the like.

The reactants of the present invention combine in equimolecular proportions, without catalytic aid, to produce alkyl N-alkyl-N-sorbitylcarbamates. There are apparently no by-products formed to contaminate the product or to otherwise interfere with the reaction. The product is obtained, at the conclusion of the reaction, by filtration in order to easily separate it from the solvent, if such is employed, and the unused reactants. If desired, and such is preferable, the product may be recrystallized from a suitable solvent such as 95% ethanol, and dried. Thus, a pure product is readily obtained.

The compounds of the present invention are in varying degrees soluble in water. Their water solutions give high foam of marked stability. These compounds are also soluble in kerosene and when the kerosene solution is mixed with water a stable emulsion is spontaneously formed, indicating usefulness as an oil soluble emulsifier.

The present compounds may also be used as fungicides. For one instance, ethyl N-dodecyl-N-sorbitylcarbamate was evaluated in a standard fungitoxicity test and showed 100% inhibition against *Monilinia fructicolo* at a concentration of 0.1% and 97% inhibition at a concentration of 0.01%. It further showed 100% inhibition against *Stemphylium sarcinaeforme* at a concentration of 0.1%. Similarly, the other compounds of this invention showed fungitoxic activity.

The alkyl N-alkyl-N-sorbitylcarbamates are prepared in accordance with the present invention in the manner disclosed in the following illustrative examples, in which parts by weight are used throughout.

Example 1

There were introduced into a three-neck flask, equipped with a stirrer, a thermometer and a reflux condenser, 15 parts of the cyclic urethane of N-methyl-N-sorbitylcarbamic acid and 12.6 parts of lauryl alcohol. This mixture was heated for fifteen minutes and then there was added 50 parts of dimethylformamide. The temperature of the reaction mixture was raised to 60° to 70° C. and held in that range for four and a half hours. The mixture was allowed to cool gradually and stand at room temperature overnight. A white crystalline substance was observed which was separated by filtration. The filtrate was subjected to partial evaporation to produce additional crystals. The crystalline compounds were combined and then crystallized twice from 95% ethanol. The yield of pure product was in excess of 61%. The product, which was a white crystalline solid, had a melting point of 146°–149° C. and was identified as dodecyl N-methyl-N-sorbitylcarbamate. This product may also be named N-methyl-N-sorbityldodecyl urethane.

In a similar way, there was prepared isopropyl N-decyl-N-sorbitylcarbamate.

Example 2

Into a reaction vessel there were placed 29.1 parts of the cyclic urethane of N-hexyl-N-sorbitylcarbamic acid and 27 parts of octadecanol. The mixture was heated for twenty minutes and then 80 parts of dimethylformamide was added. The temperature of the mixture was raised to the reflux point and maintained at that level for two hours. The mixture was allowed to cool gradually to room temperature. The solid product was separated by filtration and washed with 25 parts of dimethylformamide. The product corresponded to octadecyl N-hexyl-N-sorbitylcarbamate.

Example 3

There were added into a reaction vessel 37.5 parts of the cyclic urethane of N-dodecyl-N-sorbitylcarbamic acid, 4.6 parts of ethanol, and 75 parts of dimethylformamide. The mixture was heated to 55° to 57° C. and held at that level for three hours. The mixture was allowed to return to room temperature. A light brown semisolid was observed which was separated by filtration. The solid product was washed with a small portion of dimethylformamide and dried. The product had a nitrogen content of 3.40% (3.33% theoretical) and was identified as ethyl N-dodecyl-N-sorbitylcarbamate.

In like manner, decyl N-methyl-N-sorbitylcarbamate was made.

Example 4

There were mixed together in a reaction vessel 31.9 parts of the cyclic urethane of N-octyl-N-sorbitylcarbamic acid, 13.0 parts of tert-octanol, and 60 parts of toluene. The mixture was heated to reflux for a period of three and a half hours. The mixture was allowed to cool to room temperature and was then filtered. The solid product was washed with a small portion of toluene and dried. The solid was identified as tert-octyl-N-octyl-N-sorbitylcarbamate.

Similarly, there was produced nonyl N-butyl-N-sorbitylcarbamate and octyl-N-octyl-N-sorbitylcarbamate.

Example 5

A mixture of 45.9 parts of the cyclic urethane of N-octadecyl-N-sorbitylcarbamic acid, 10.2 parts of hexanol, and 60 parts of toluene was added to a reaction vessel and heated to reflux for three hours. The mixture was allowed to cool and, when about room temperature was reached, the solid product was removed by filtration. The product was washed with a small portion of toluene and dried. The product was identified as hexyl N-octadecyl-N-sorbitylcarbamate.

I claim:

1. A process for preparing a compound having the formula

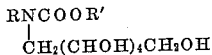

in which R is an alkyl group of one to eighteen carbon atoms and R' is an alkyl group of one to eighteen carbon atoms, which comprises bringing together at a reacting temperature a cyclic urethane of an N-alkyl-N-sorbitylcarbamic acid, made by reacting an N-alkylglucamine with urea until two equivalents of ammonia are liberated, with an alkanol.

2. A process for preparing a compond having the formula

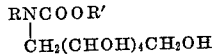

in which R is an alkyl group of one to eighteen carbon atoms and R' is an alkyl group of one to eighteen carbon atoms, the total of carbon atoms in R plus R' being no more than twenty-four, which comprises reacting in the temperature range of 40° C. to the reflux temperature of the reaction mixture a cyclic urethane of an N-alkyl-N-sorbitylcarbamic acid, made by reacting an N-alkylglucamine with urea until two equivalents of ammonia are liberated, with an alkanol.

3. A process for preparing a compound having the formula

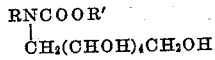

in which R is an alkyl group of one to eighteen carbon atoms and R' is an alkyl group of one to eighteen carbon atoms, the total of carbon atoms in R plus R' being no more than twenty-four, which comprises reacting in the presence of a volatile, inert organic solvent and in the temperature range of 40° C. to the reflux temperature of the reaction mixture a cyclic urethane of an N-alkyl-N-sorbitylcarbamic acid, made by reacting an N-alkylglucamine with urea until two equivalents of ammonia are liberated, with an alkanol.

4. A process for preparing a compound having the formula

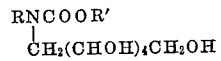

in which R is an alkyl group of one to eighteen carbon atoms and R' is an alkyl group of one to eighteen carbon atoms, the total of carbon atoms in R plus R' being no more than twenty-four, which comprises reacting in the presence of a volatile, inert organic solvent and in the temperature range of 40° C. to the reflux temperature of the reaction mixture a cyclic urethane of an N-alkyl-N-sorbitylcarbamic acid, made by reacting an N-alkylglucamine with urea until two equivalents of ammonia are liberated, with an alkanol and separating the product.

5. A process for preparing ethyl N-dodecyl-N-sorbitylcarbamate which comprises reacting in the presence of a volatile, inert organic solvent and in the temperature range of 40° C. to the reflux temperature of the reaction mixture the cyclic urethane of N-dodecyl-N-sorbitylcarbamic acid, made by reacting N-dodecylglucamine with urea until two equivalents of ammonia are liberated, with ethanol.

6. A process for preparing dodecyl N-methyl-N-sorbitylcarbamate which comprises reacting in the presence of a volatile, inert organic solvent and in the temperature range of 40° C. to the reflux temperature of the reaction mixture the cyclic urethane of N-methyl-N-sorbitylcarbamic acid, made by reacting N-methylglucamine with urea until two equivalents of ammonia are liberated, with dodecanol.

7. A process for preparing octadecyl N-hexyl-N-sorbitylcarbamate which comprises reacting in the presence of a volatile, inert organic solvent and in the temperature range of 40° C. to the reflux temperature of the reaction mixture the cyclic urethane of N-hexyl-N-sorbitylcarbamic acid, made by reacting N-hexylglucamine with urea until two equivalents of ammonia are liberated, with octadecanol.

8. A process for preparing octyl N-octyl-N-sorbitylcarbamate which comprises reacting in the presence of a volatile, inert organic solvent and in the temperature range of 40° C. to the reflux temperature of the reaction mixture the cyclic urethane of N-octyl-N-sorbitylcarbamic acid, made by reacting N-octylglucamine with urea until two equivalents of ammonia are liberated, with octanol.

9. A process for preparing hexyl N-octadecyl-N-sorbitylcarbamate which comprises reacting in the presence of a volatile, inert organic solvent and in the temperature range of 40° C. to the reflux temperature of the reaction mixture the cyclic urethane of N-octadecyl-N-sorbitylcarbamic acid, made by reacting N-octadecylglucamine with urea until two equivalents of ammonia are liberated, with hexanol.

References Cited in the file of this patent

UNITED STATES PATENTS 2,677,698    Deutschman et al. _____ May 4, 1954